United States Patent [19]

McNair et al.

[11] Patent Number: 5,125,068
[45] Date of Patent: Jun. 23, 1992

[54] APPARATUS FOR CONTROLLING HEATING OF FLUIDS UTILIZING ADJUSTABLE TEMPERATURE SET POINT

[75] Inventors: John D. McNair, Olinda; David A. Richards, Peakhurst, both of Australia

[73] Assignee: Black & Decker Inc., Newark, Del.

[21] Appl. No.: 737,964

[22] Filed: Jul. 30, 1991

[30] Foreign Application Priority Data

Jul. 30, 1990 [AU] Australia .............................. PK 1455

[51] Int. Cl.⁵ .............................................. F24H 1/18
[52] U.S. Cl. .................................... 392/441; 392/449; 219/494; 126/374; 236/99 C; 236/21 B
[58] Field of Search ........ 392/441, 449, 498, 450–454; 219/494; 126/374, 361, 334; 236/21 B, 99 C; 432/29

[56] References Cited

FOREIGN PATENT DOCUMENTS

| 2260143 | 6/1974 | Fed. Rep. of Germany | 392/441 |
| 3309914 | 9/1984 | Fed. Rep. of Germany | |
| 2236455 | 2/1975 | France | 392/441 |
| 56-3850 | 1/1981 | Japan | 392/451 |
| 58-210427 | 12/1983 | Japan | 392/449 |
| 2228069 | 8/1990 | United Kingdom | 126/374 |

Primary Examiner—Bruce A. Reynolds
Assistant Examiner—John A. Jeffery
Attorney, Agent, or Firm—Barry E. Deutsch

[57] ABSTRACT

A temperature control device for a fluid heating vessel senses ambient temperature and controls or adjusts the set point at which power is reduced to an element for heating the fluid in the heating vessel, in order to prevent boil-over of the fluid. The The point is increased for an ambient temperature higher than a predetermined ambient temperature and is decreased for an ambient temperature lower than said predetermined ambient temperature.

3 Claims, 4 Drawing Sheets

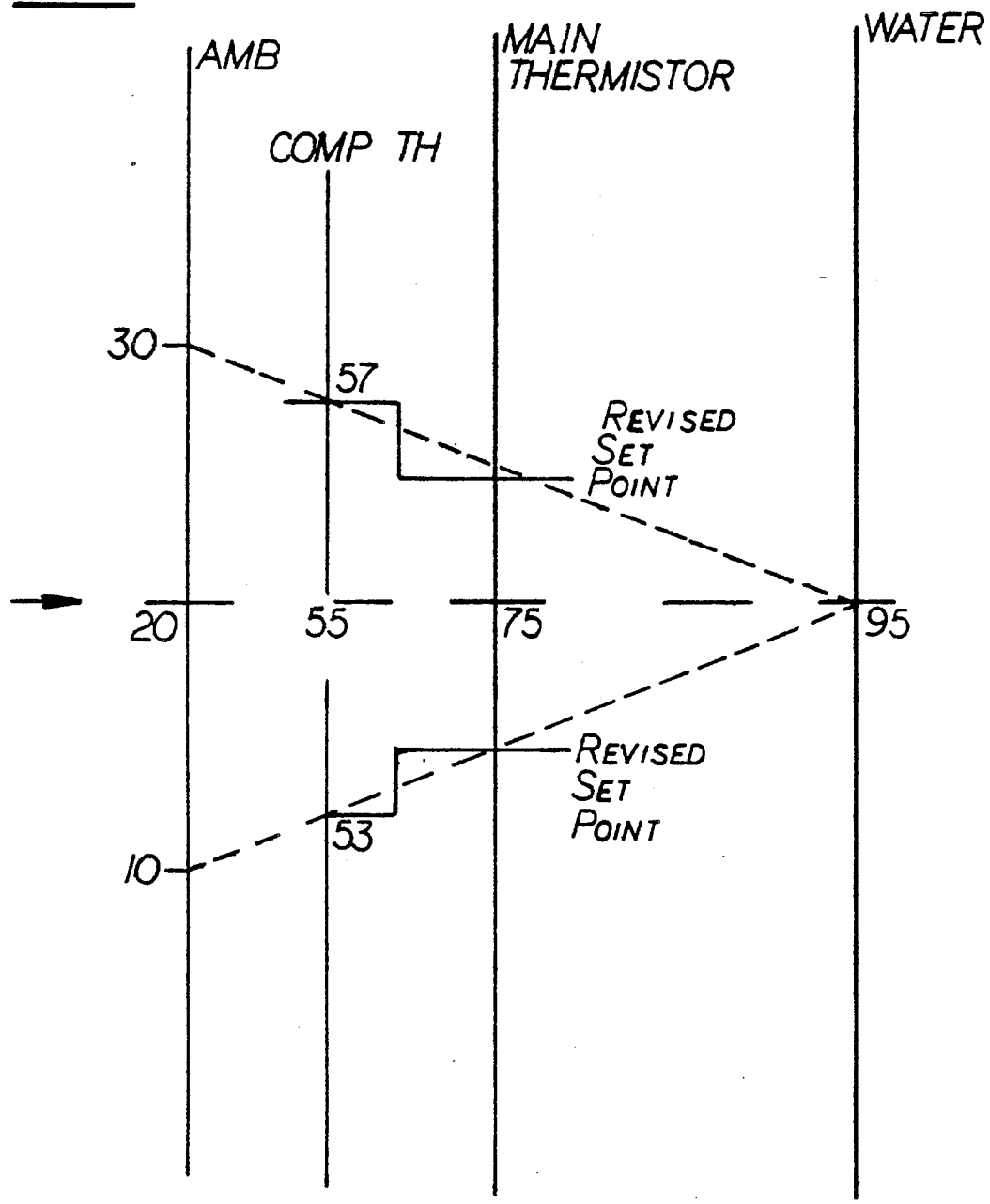

APPARATUS FOR CONTROLLING HEATING OF FLUIDS UTILIZING ADJUSTABLE TEMPERATURE SET POINT

BACKGROUND OF THE INVENTION

The present invention relates to apparatus for controlling heating of fluids, and in particular, relates to apparatus for controlling and/or monitoring temperature of fluids being heated.

Many fluid heating vessels, such as kettles, urns or jugs, utilize electronic controls to attain and maintain the fluid in the vessel at or near a predetermined temperature.

The basic vessel is generally of an insulating material such as thermoplastic, thermoset plastic phenolic or porcelain china (such as old style jugs). Typically, the wall thickness is about 2-5 mm.

In most heating units for the vessels, the energy used is electrical, and the vessel incorporates a sheathed mineral insulated element, direct (wire in water) element, dielectric (2 plate) unit, for example. Any other fuel (gas/oil) is also sometimes used.

In the case of a sheathed electrical element a control circuit is used in the vessel. Typically, where electronic controls are used, the actual sensor is a temperature dependent resistor (or thermistor). In this case the thermistor changes its resistance in accordance with changes in the temperature around the thermistor. The output of the control is in response to the changes sensed by the thermistor either switched on or off (proportional control) or the power supplied to heat the fluid is changed using wave chopping phase modulation, or other known techniques to increase or decrease the amount of power supplied to the heating element as required.

FIG. 1 illustrates some typical problems encountered in vessels used for the heating of fluids, for example water. Path 1 represents the temperature of fluid in a vessel when a great deal of energy is used to heat the fluid quickly. The fluid temperature rises in a short period of time and when the fluid temperature approaches boiling point (100° C.) and just before point A, power is switched off from the heating element. However, the fluid temperature undesirably continues to increase into "boil over", between points A and B, before reducing to reach the desired fluid temperature (say 98° C.). In the case of an urn or large fluid heating vessel, this temperature must then be maintained. Energy is wasted between points A and B.

Path 2 illustrates an alternative, where the fluid is slowly heated over a long period of time. This avoids "boil over", however, it takes far too long for the fluid to reach its desired temperature.

The problems illustrated in FIG. 1 principally stem from:

(1) Time constant of the fluid temperature monitoring device (thermistor);
(2) Thermal "lag" due to indirect sensing;
(3) Ambient temperature changes; and
(4) Proximity of desired temperature to boiling point of the fluid, for example water (100° C.).

These problems appear to result for the following reasons:

(1) In fluid vessels, with a thermistor located in the fluid (direct sensing), the reaction time of the thermistor itself, on fast heating units, can cause "overshoot" in simple controls as shown in FIG. 1, path 1. Also there exists technical problems of electrically isolating the thermistor leads, as well as preventing corrosion thereof. This generally leads to a design that to all intents, looks similar to indirect designs as described below.

(2) As shown in FIG. 2, a typical indirect sensing application is shown in a water heating urn 3. The water temperature sensing thermistor 4 is pushed into a preformed pocket 5 either provided in the water heating chamber wall 6 or which is integrally molded with the vessel wall. Generally, a heat conducting paste 7 is used to enhance the sensing of the water 8 temperature by the thermistor 4. Thermal lag occurs due to the time required for a temperature change in the fluid to be transmitted through the vessel wall 6, the paste 7 and the body of the thermistor 4 before being (electronically) sensed by the thermistor.

(3) An ambient thermistor 9 actually reads a temperature somewhere between the temperature of the water 8 and the temperature of the air 11 which exists between the water heating chamber 6 and the outside wall 10 of the urn 3. A printed circuit board is mounted to carry ambient temperature thermistor 9 and the water temperature thermistor 4. From cold start up, the temperature around the PCB will slowly rise from room ambient temperature to steady state operating temperature, providing delays in heating the fluid as desired.

(4) Water at normal atmospheric pressure boils at 100° C. However, at or above 100° C. any energy added is dissipated as steam as no temperature increase is possible. If water temperature is desired at say 97° C., and if the heating rate is faster than the thermistor/thermal lag etc. can cope with, then the water temperature will pass through 97° C., through boiling point, and the fluid will boil until the thermistor catches up. This could be, typically, half a minute or more as shown in FIG. 1, path 1. This is due to the fixed "set point" by which the heater element control is influenced. The "set point" is the temperature sensed at which the heating control circuit turns off or reduces heating of the fluid, during fluid heating to a desired level. If the vessel heating control is an on/off type, then the full element wattage is applied to the water after boiling; this is undesirable.

SUMMARY OF THE INVENTION

An object of the present invention is a fluid heating vessel which quickly heats fluid without excessive undesirable "boil over".

A further object of the present invention is a fluid heating vessel which compensates for thermal lag in measurement of temperature.

A still further object of the present invention is a fluid heating vessel with a simple inexpensive adjustable "set point" that will compensate for heating up as well as ambient temperature changes.

It has surprisingly been found that ambient temperature has effect on operating temperature with regard to "boil over" of a fluid heating vessel. As shown in FIG. 3, it has been observed that, if ambient temperature is normalized at 20° C., and a desired water temperature is 95° C., the heating controller set point should be set to switch off or reduce power to the heating element at 75°

C., as measured by the water temperature sensing thermistor 4 of FIG. 2.

However, if ambient temperature is 30° C., the vessel will heat water to only 90° C., when the thermistor senses 75° C., and if ambient temperature is 10° C., the vessel will heat water to 100° C. ("boil over").

The present invention provides a temperature control device for a fluid heating vessel, said device comprising:
- fluid temperature sensing means adapted to provide an indication of the temperature of fluid in said vessel;
- control means adapted to regulate the supply of heat to said fluid during a heating action; and
- ambient temperature sensing means for providing an indication of ambient temperature and for generating a control signal indicative of the sensed temperature, said ambient means being coupled to said control means wherein the magnitude of the control signal is varied in accordance with the temperature sensed by said ambient means to substantially prevent the temperature of said fluid rising to an undesirable level.

Preferably, the ambient temperature is sensed proximate the fluid vessel.

The present invention also provides a temperature control device for a fluid heating vessel, said device comprising:
- fluid temperature sensing means adapted to provide an indication of the temperature of fluid in said vessel,
- control means coupled to said fluid means and adapted to regulate the supply of heat to said fluid during a heating action in accordance with a set point; and
- set point means adapted to provide an adjustable set point, said set point means being influenced by sensed ambient temperature.

In a particularly preferred arrangement the set point means comprises a second temperature sensing means adapted to sense temperature on an outer wall surface of said fluid heating vessel whereby said second temperatures sensing means is influenced by both ambient temperatures and temperatures of the fluid within said vessel.

BRIEF DESCRIPTION OF THE DRAWING

Preferred embodiments of the present invention will now be described with reference to the accompanying drawing, wherein:

FIG. 7 shows, diagrammatically, the practical results of an adjustable set point with regard to heating of water.

DESCRIPTION OF THE PREFERRED EMBODIMENT

Figure 4:
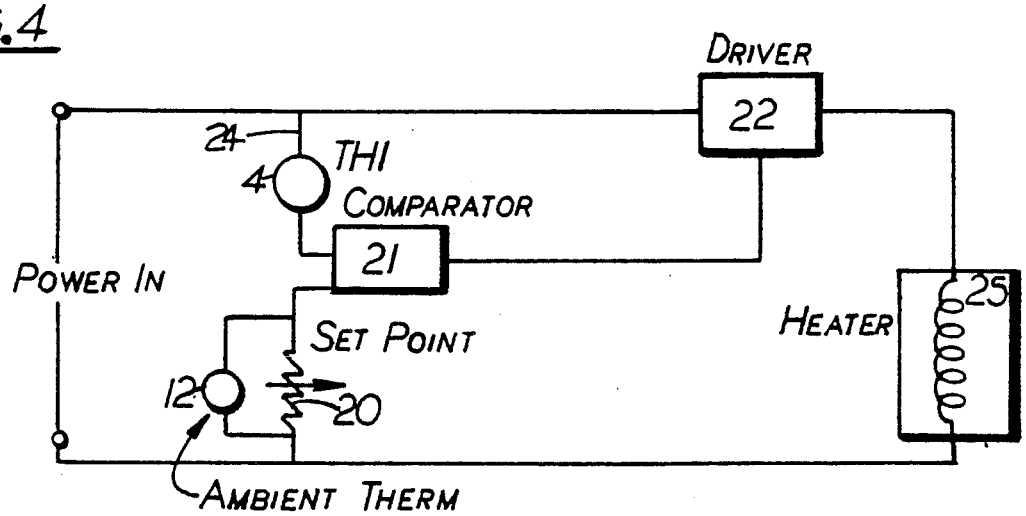
FIG. 4 shows a circuit diagram of one embodiment of the present invention.

With regard to FIG. 4, one possible circuit arrangement is disclosed for carrying out the present invention although other circuits might also be used. In the illustrated circuit the thermistor 4 senses fluid temperature and generates a control signal. The control signal is supplied to comparator 21 via electrical conductor 24 which compares the control signal with an adjustable set point reference signal. The adjustable set point is provided, in this embodiment, by set resistor 20 in parallel with ambient thermistor 12. As the sensed ambient temperature is increased, the set point (resistances of 20 and 12) alter. When the resistance of thermistor 4 and set point resistor/thermistor (20/12 are equal, the comparator will turn off or influence driver 22 to reduce power supplied to heater 25.

Figure 1:
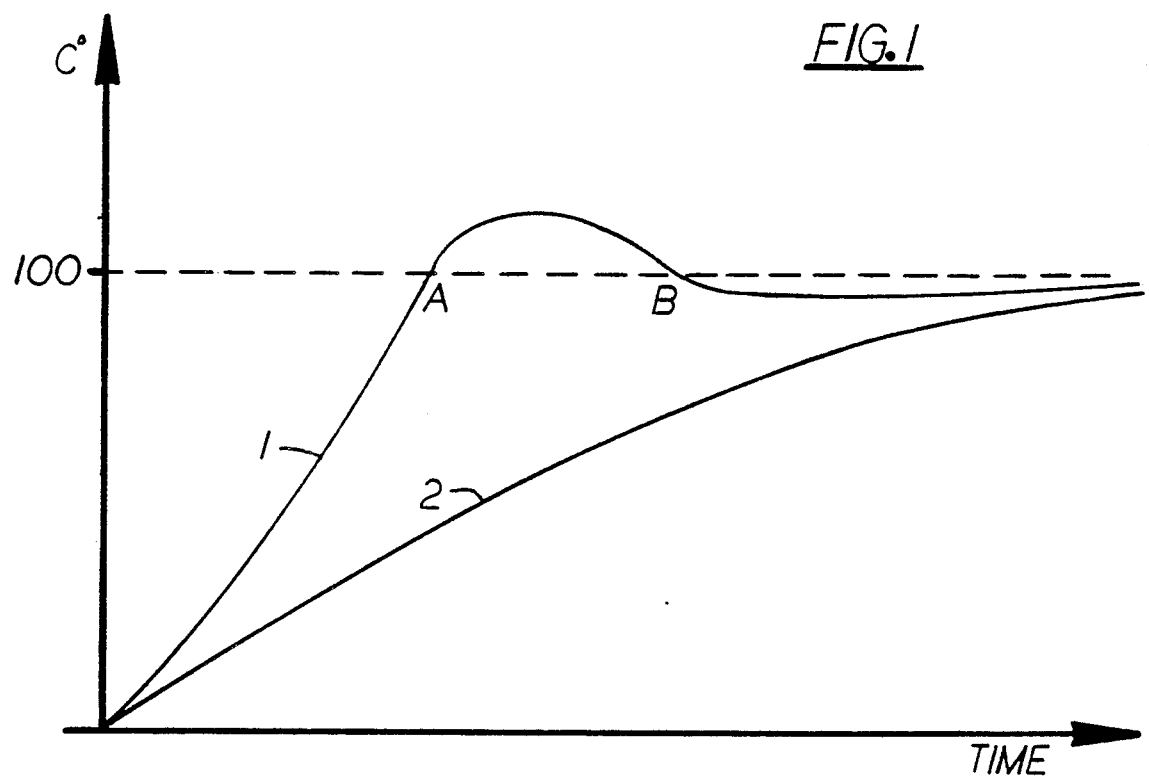
FIG. 1 shows, diagrammatically, water temperature over time as water is heated.
Figure 2:
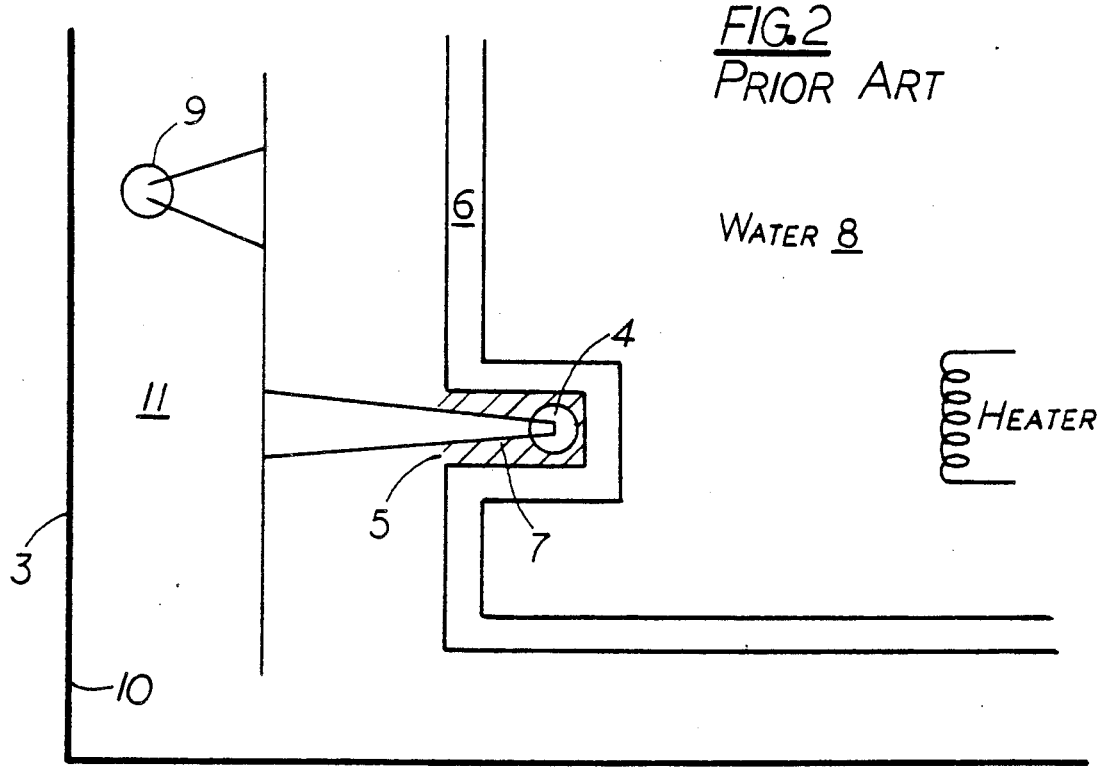
FIG. 2 shows a prior art water temperature control.
Figure 5:
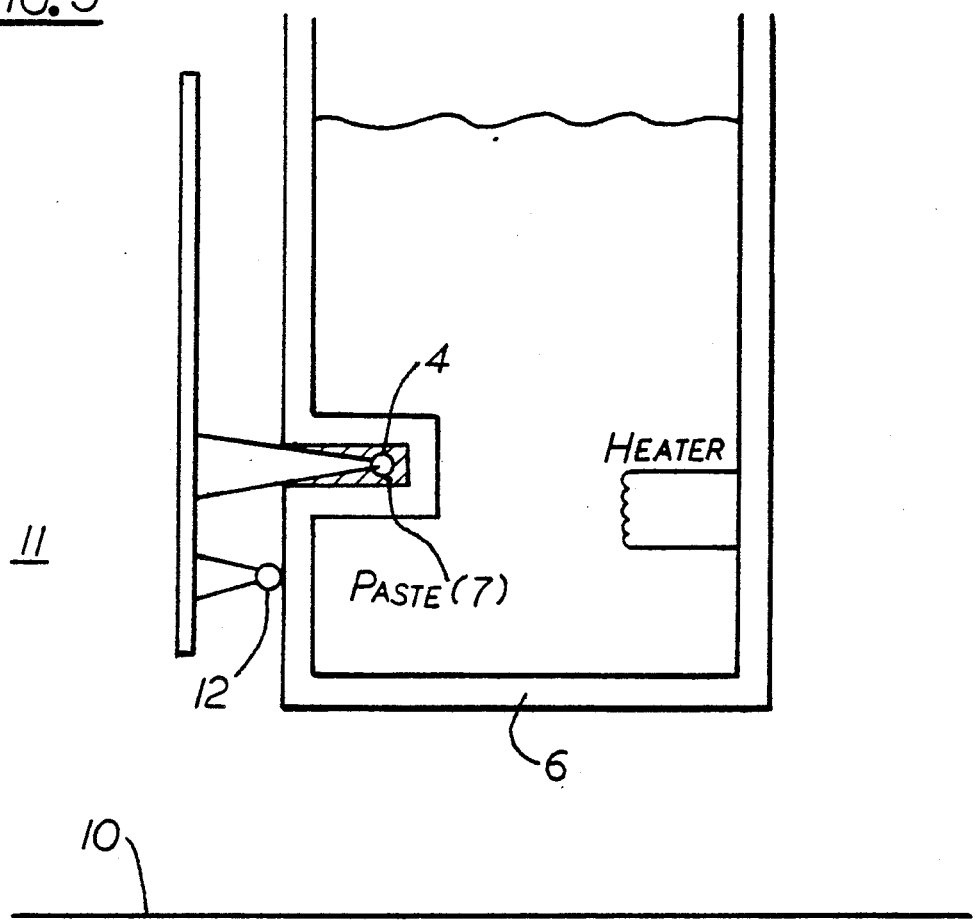
FIG. 5 shows one embodiment of the present invention.

FIG. 5 shows one embodiment of the present invention as applied to a fluid heating vessel. The fluid vessel is similar to that of FIG. 2, except that the ambient thermistor 9 is replaced by set point thermistor 12. In this embodiment the thermistor 12 thermally engages the outside of the fluid heating vessel 6 so that it is influenced both by ambient temperatures and temperatures of the fluid within the vessel.

Figure 6:
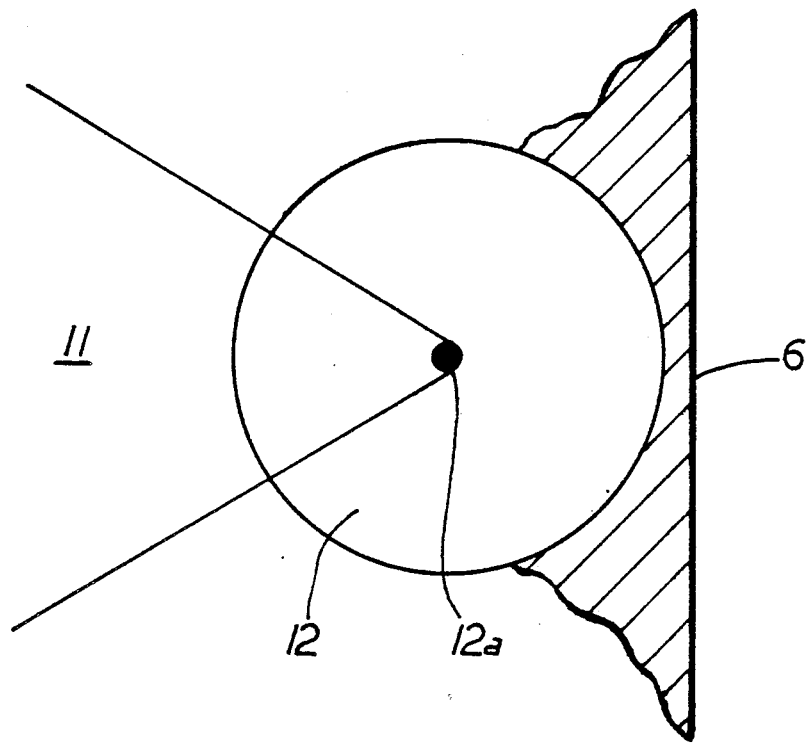
FIG. 6 shows, in more detail, the ambient thermistor located against the wall of the fluid vessel.

FIG. 6 shows in greater detail the location of thermistor 12. The actual temperature measurement is sensed inside the body of the thermistor 12 at point 12a. At this point 12a, heat is sensed from the wall 6 which in turn is influenced by the water being heated, and point 12a is also influenced by the temperature of the ambient air 11 which exists proximate the vessel wall 6. The temperature of the fluid being heated is thus less dependent on ambient air temperature alone. Thus the measurement sensed at point 12a is realized somewhere between the actual fluid temperature in the vessel and ambient air temperature around the vessel.

As the water heats, the temperature at point 12a will be increased, thus adjusting the set point of the control circuit for the heater element.

Figure 3:
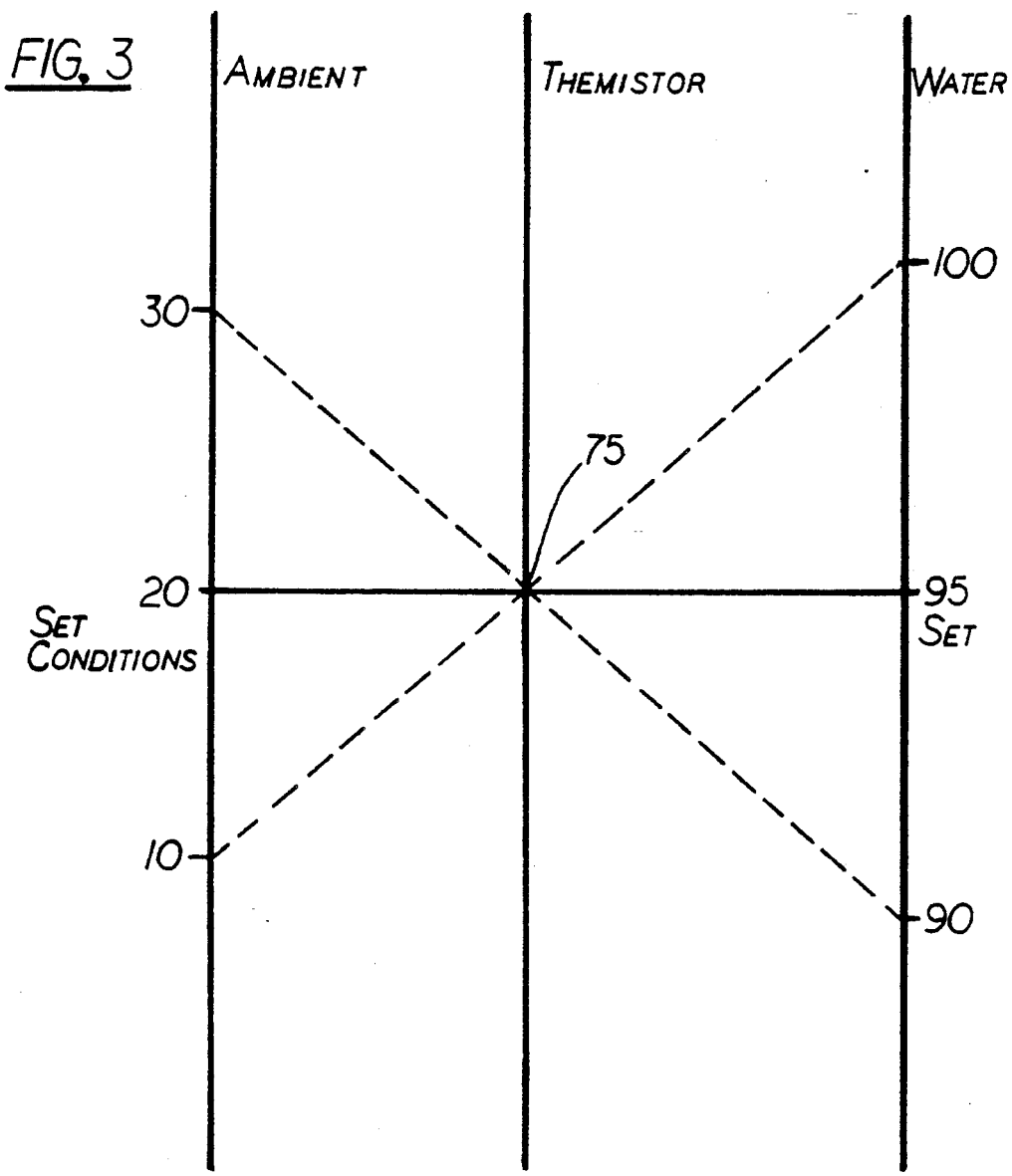
FIG. 3 shows, diagrammatically, the relationship between final water temperature and ambient water temperature with a fixed set point control device.

FIG. 7 shows diagrammatically the results of the present invention. If compared with FIG. 3, it can be seen that the heated water temperature will always be heated to the desired temperature (say 95° C.) regardless of ambient temperature. In this example, if ambient temperature is 10° C., at point 12a, the temperature sensed is 53° C., resulting in a set point being reduced below 75° C., in order to turn the heater off earlier to attain water at 95° C. Whereas, if the ambient temperature is 30° C., point 12a senses 57° C., the set point is increased above 75° C., and the heater is turned off later to attain water heated to 95° C. Alternative embodiments, may include a "look-up table" for example, memory means coupled to a microprocessor in order to adjust the set point and control the fluid heating. In this alternative embodiment, ambient temperature and a fixed set point can be sensed and provided as input to a look-up table which will provide an adjusted set point as output for use by the control circuitry.

We claim:

1. A temperature control device for a fluid heating vessel, said device comprising:
   fluid temperature sensing means adapted to provide an indication of the temperature of fluid in said vessel;

control means having a predetermined set point and adapted to regulate the supply of heat to said fluid during a heating action; and ambient temperature sensing means for providing an indication of ambient temperature, and for generating a control signal indicative of the sensed temperature, said ambient sensing means being coupled to said control means wherein the magnitude of the control signal is varied in accordance with the temperature sensed by said ambient sensing means to decrease the set point when the sensed ambient temperature is below a predetermined temperature and to increase the set point when the ambient temperature is above said predetermined temperature to increase the temperature of said fluid to a desired predetermined level irrespective of the sensed ambient temperature.

2. A temperature control device for a fluid heating vessel, said device comprising:

fluid temperature sensing means adapted to provide an indication of the temperature of fluid in said vessel, control means coupled to said fluid temperature sensing means and adapted to regulate the supply of heat to said fluid during a heating action in accordance with a set point; and set point means adapted to provide an adjustable set point, said set point means being influenced by sensed ambient temperature wherein the set point is increased for an ambient temperature higher than a predetermined ambient temperature and is decreased for an ambient temperature lower than said predetermined ambient temperature to increase the temperature of said fluid to a desired predetermined level irrespective of said sensed ambient temperature.

3. A temperature control device according to claim 2, wherein said set point means comprises a second temperature sensing means adapted to sense temperature on an outer wall surface of said fluid heating vessel whereby said second temperature sensing mean is influenced by both ambient air temperatures and temperatures of the fluid within said vessel.

* * * * *